United States Patent [19]

Schara et al.

[11] Patent Number: 4,847,371

[45] Date of Patent: Jul. 11, 1989

[54] PROCESS FOR PREPARING MODIFIED, PREGELATINIZED DENT CORNSTARCH AND PRODUCT THEREOF

[75] Inventors: Robert E. Schara, Princeton Junction; Jay H. Katcher, Cranbury, both of N.J.

[73] Assignee: General Foods Corporation, White Plains, N.Y.

[21] Appl. No.: 110,917

[22] Filed: Oct. 20, 1987

[51] Int. Cl.$^4$ .................. G08B 31/08; A23L 1/195
[52] U.S. Cl. .................................... 536/111; 426/578; 426/579
[58] Field of Search ................. 536/111; 426/578, 579

[56] References Cited

U.S. PATENT DOCUMENTS

| | | | |
|---|---|---|---|
| 4,280,851 | 7/1981 | Pitchon et al. | 127/33 |
| 4,431,800 | 2/1984 | Leusner et al. | 536/111 |
| 4,477,480 | 10/1984 | Siedel et al. | 426/578 |
| 4,600,472 | 7/1986 | Pitchon et al. | 159/4.4 |

Primary Examiner—Morton Foelak
Assistant Examiner—Nathan M. Nutter
Attorney, Agent, or Firm—T. R. Savoie; D. J. Donovan

[57] ABSTRACT

A high-solids, slurry of dent cornstarch is hydroxypropylated, washed, neutralized and spray-dried to produce an essentially flavor-free, pregelatinized modified cornstarch which has a viscosity building capacity equivalent to pregelatainized tapioca starch.

5 Claims, 1 Drawing Sheet

PROCESS FOR PREPARING MODIFIED, PREGELATINIZED DENT CORNSTARCH AND PRODUCT THEREOF

BACKGROUND OF THE INVENTION

Instant food powders, such as powdered dessert mixes, which are designed to be combined with milk or water in order to obtain a viscous food, typically contain a pregelatinized starch ingredient. This starch is used primarily as a thickneing agent in such products as powdered, instant pudding mixes. To date, tapioca starch has been a starch of choice as it inherently possesses a clean flavor and has other physical properties (i.e. a low gel temperature) which makes it particularly suitable for use in instant pudding mixes.

Tapioca starch is a raw material which is obtained primarily from southeast Asia and, as such, a reliable and economical supply of tapioca starch may be disrupted by various political or climatical events. Dent cornstarch is a material which is in abundant supply in the United States and is a relatively inexpensive commodity. However, dent cornstarch possesses a flavor which has been characterized as "woody" or "corny" and an undesirable odor. Dent cornstarch also has a relatively-high gel temperature. These negative characteristics are especially detrimental when it is desired to produce a pregelatinized dent cornstarch for use in instant pudding mixes.

Dent cornstarch has a gelatin temperature of approximately 82° C., as compared to tapioca starch which has a gelatin temperature of 69° C. This higher gel temperature for cornstarch makes it more difficult to cook as compared to tapioca starch. While it is known to reduce the gelatinization temperature of starch by chemical modification, such as hydroxypropylation, these efforts have not previously produced a pregelatinized dent cornstarch which has the ability to build viscosity and impart a desirable texture to an instant pudding in the same manner as is possible with more expensive starches such as tapioca and waxy maize. The apparent low capacity of pregelatinized dent cornstarch to build viscocity necessitates the use of additional starch material, as compared to tapioca and waxy maize starch, which further compounds the problems of off-tastes, off-odors and adverse textural impact which are inherent with dent cornstarch.

Various techniques are known to the art for treating and/or modifying cornstarch. For instance, U.S. Pat. No. 4,477,480 to Seidel et al. discloses a process for removing off-tastes from cereal starches such as cornstarch. U.S. Pat. No. 4,431,800 to Leusner et al, discloses a process for hydroxypropylating various starches, including cornstarch, in order to improve the physical characteristics related to the starch's performance as a thickener in products such as puddings. U.S. Pat. No. 4,280,851 to Pitchon et al, discloses a method and apparatus for producing spray-dried, pregelatinized starches, including cornstarch, wherein a starch slurry is sprayed into a nozzle cap where the starch particles are gelatinized. Thereafter, the gelatinized particles are dried, such as in a spray drying tower.

Up to the present time, however, there has not been available either economically-produced, pregelatinized cornstarch or pregelatinized cornstarch which is suitable for use in powdered instant food products, such as instant pudding mixes.

DESCRIPTION OF THE INVENTION

Figure 1:
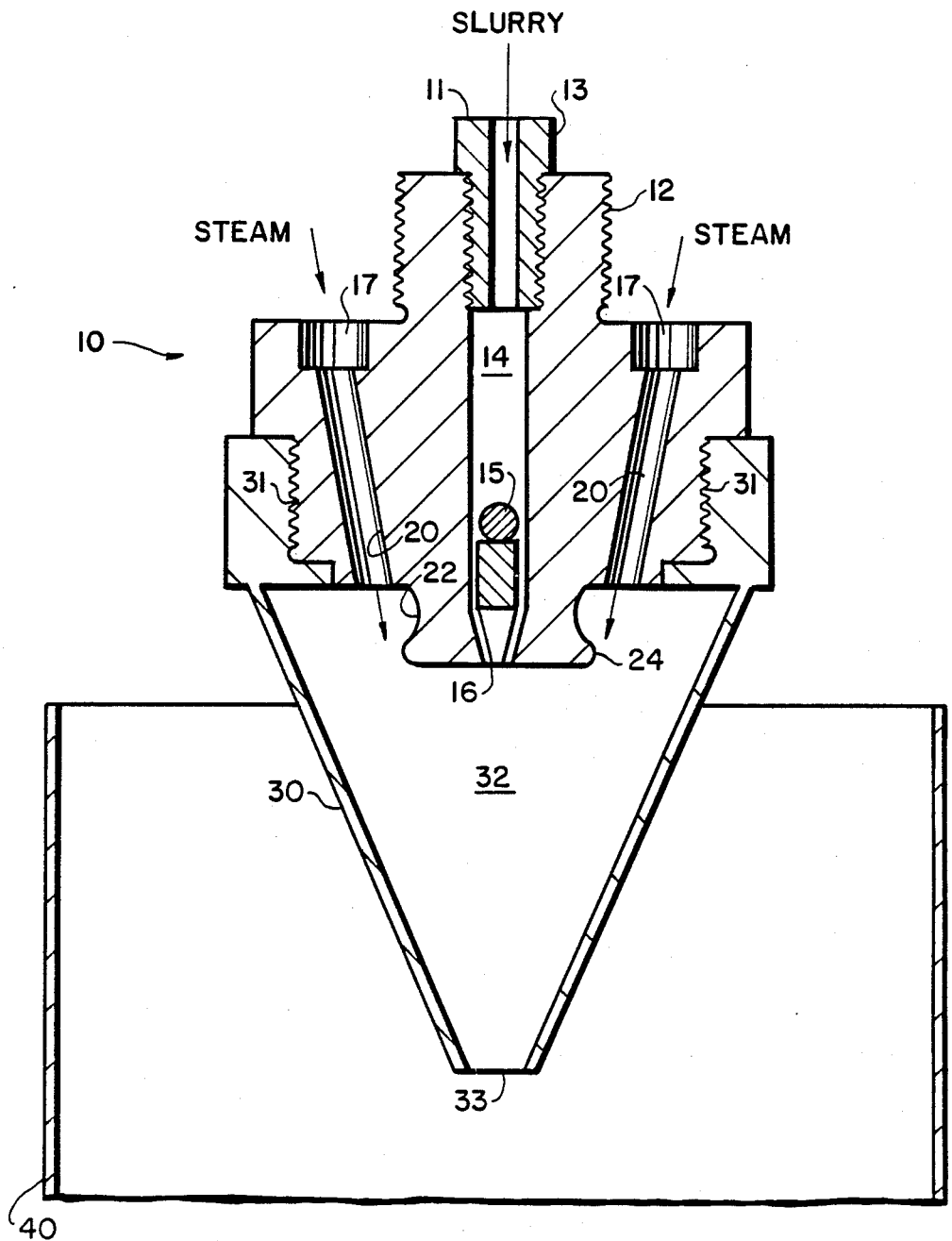
FIG. 1 is an elevational; cross-sectional view illustrating details of construction of one embodiment of a two-fluid nozzle for use in the process of this invention.

According to this invention a novel starch material is produced consisting of a spray-cooked and spray-dried, pregelatinized, hydroxypropylated dent cornstarch. This treated cornstarch is essentially flavor-free and possesses a level of hydroxypropylation which produced a gel temperature in the ungelatinized cornstarch of from 53° to 59° C. This level of hydroxypropylation coupled with a relatively high amount of cooking which results from the use of a special nozzle is effective, during the spray cooking and spray drying process, to produce a pregelatinized dent cornstarch which has viscosity building and texture characteristics in puddings comparable to an equal amount of pregelatinized tapioca starch.

The novel cornstarch material is prepared by forming an aqueous slurry of raw, dent cornstarch having a starch solids content of from about 0.5 to 0.7 parts cornstarch for each part water. The slurry will also contain from 0.01 to 0.4 parts of inorganic salt per part cornstarch. The inorganic salt, which functions as a processing aid, is preferably selected from the group consisting of sodium sulfate, sodium chloride or magnesium sulfate, as well as any combination of these salts.

The slurry will also contain sufficient basic material such as the salt of an alkali or alkaline earth metal, especially a hydroxide, carbonate, bicarbonate or phosphate, thereof, or an organic alkali or combinations of these salts, to elevate the pH of the slurry to between 10.5 and 12.3. The pasting pH for dent cornstarch is about 12.5. It is preferred that this basic material be chosen from the group comprised of trisodium phosphate, sodium hydroxide, potassium hydroxide, calcium oxide and combinations thereof.

The homogenous slurry can be prepared in or fed to a reaction vessel in which the hydroxypropylation reaction will occur. Preferably, the reaction vessel will be a sealable vessel and able to withstand pressure of up to about 5 atmospheres. The slurry will be agitated during the reaction.

Propylene oxide is added to the slurry contained in the reaction vessel in an amount of from 0.06 to 0.2 parts per part of cornstarch. The vessel is then sealed to prevent volatilization and loss of propylene oxide and the reaction is allowed to proceed at a temperature between 20° C. and 60° C. for from 3 to 30 hours, preferably 8 to 24 hours, so as to reduce the gel temperature of the dent cornstarch to between 53° and 59° C. After the desired reaction time, the reaction vessel is vented and preferably, residual propylene oxide is removed from the slurry, such as by aeration with a non-reactive gas (e.g. nitrogen, compressed air, etc.).

The reacted slurry is next removed from the reactor and washed. Washing may be accomplished by a conventional washing centrifuge such as a Merco Model C 30-W made by the Dorr-Oliver Co. (Stamford, CT). The washing centrifuge is controlled to produce an underflow slurry of from 35 to 45% solids. The amount of water added during the washing process, both as dilution water and as wash water, is from 0.6 to 1.8 gallons (2.27 to 4.54 1) per pound (454 g) of starch solids, typically about 1.0 gallons (3.78 1) per pound.

The concentrated starch slurry obtained from the washing step is neutralized to a pH of from 6.0 to 9.0, preferably between about 7.5 to 8.5. The slurry may be neutralized with any non-chlorine-containing mineral or organic food-grade acid such as sulfuric, phosphoric, nitric or the like.

In order to complete the processing of this invention, the washed and neutralized high-solids starch slurry, having the solids level of 35 to 43% is injected through an atomization aperture of a two-fluid nozzle and into a heating chamber. A heating medium, such as steam, is also injected into the heating chamber which currounds the atomization and injection apertures. The heating chamber contains a vent aperture located below and spaced-apart from the atomization and injection apertures and through which the atomized slurry droplets exit and pass into contact with heated air, such as in a drying tower, which effect drying of the spray droplets. The cooking chamber is sized to enable the starch slurry droplets to be retained within the chamber for a period of time which will effect uniform and sufficient gelatinization of dent cornstarch.

Atomization, cooking and drying of the cornstarch is conducted generally in accordance with the procedure set forth in the aforementioned Pitchon et al. patent which is hereby incorporated by reference. It has however been found that the hydroxypropylated dent cornstarch of the present invention which has a gel temperature of from 53° to 59° C. is surprisingly more difficult to fully cook than the cross-linked tapioca starch dealt with in the Pitchon et al. patent which has a somewhat higher gel temperature.

Slurries of non-crosslinked, hydroxypropylated and washed cornstarch having a gel temperature between 53° and 59° C. were gelatinized and spray dried utilizing a nozzle such as shown in FIG. 1 of the Pitchon et al. patent. The resulting pregelatinized starch was useful as an ingredient in dry pudding mixes which contain phosphate setting systems and are prepared with the addition of cold milk. It was found, however, that this cornstarch did not have the viscosity building capacity of pregelatinized tapioca starch and, therefore, could not be used as a one for one replacement for pregelatinized tapioca starch.

It is the purpose of the invention to produce an essentially flavor-free, pregelatinized cornstarch which has an equivalent viscosity building capacity as pregelatinized tapioca starch and, as such, can be used as a direct (i.e., one for one) replacement for pregelatinized tapioca starch in instant puddings. According to this invention, equivalent viscosity building capacity to tapioca starch means that in a standarized test wherein a dry-blended mix containing 80 grams of tetrasodium phosphate and 18 grams of pregelatinized starch is combined with two cups (474 ml) of cold milk, mixed for one minute, refrigerated for 30 minutes at about 46° F. (7.8° C.) and then measured for viscosity, the cornstarch-containing pudding has a viscosity which is within 5% of the comparable tapioca starch-containing pudding. Viscosity measurements are taken with a Brookfiel TM Model HAT viscometer using a helipath stand, a 36 mm. bar/type spindle, 5 rpm and a 0-500 scale. Such viscosity measurements are familiar to those skilled in the art and produce a Brookfield HAT value of about 260 for pregelatinized tapioca starch such as produced using the Pitchon et al. patent.

Although logic would conclude that starch having a lower gel temperature could be spray gelatinized more easily than starch having a higher gel temperature, the present inventors decided to evaluate spray cooking hydroxyproylated dent corn starch to a greater degree than was achieved using the Pitchon et al. nozzle. It was found that merely increasing the length of the heating chamber, as suggested by Pitchon et al., was not successful in that after 3 to 5 minutes of continuous operation spitting and globbing of starch was visible at the vent aperture. It was, therefore, necessary to develop a new, two-fluid nozzle so that the continuous spray gelatinization and drying process of the patent could be utilized to subject high-solids dent cornstarch slurries to additional cooking.

According to the present invention, a novel two-fluid nozzle is utilized in processes for producing particles. For purposes of the present invention, it was found necessary to extend the slurry orifice below the level of the steam discharge orifice and to shape the nozzle core member which contains the slurry orifice so that the flow of steam from the steam orifice impinges upon and is at least partially disrupted by the shaped core member.

Utilizing the nozzle hereinafter described, it was possible to continuously produce spray dried, pregelatinized dent cornstarch from high starch solids slurries. It was found by the present inventors that the resulting cornstarch did surprisingly possess a viscosity building capacity equivalent to tapioca starch. It has also been found that spitting and globbing occurs when high-solids tapioca starch slurries are used with the nozzle of FIG. 1.

Referring now in detail to the drawing, FIG. 1 illustrates a two-fluid nozzle assembly 10 which is in communication with sources (not shown) of steam and of a slurry of hydroxypropylated dent cornstarch having a starch solids level in excess of 35% by weight, typically from 35 to 43% by weight. As shown in FIG. 1, external threads 12 connect the nozzle core 11 with a conduit for the slurry. The nozzle core is shown to contain a single, vertically-extending bore 14 which terminates at its lower end with an aperture which contains a spinner 15 and an orifice insert 16. The top of bore 14 is fitted with a plug 13 which functions to retain spinner 15 and insert 16 within the bore. A single bore 14 is shown, however, multiple bores preferably symmetrically spaced about the longitudinal axis of core member 11 may be employed. The spinner 15 and orifice insert 16 atomize the cornstarch slurry which is pumped through bore 14 producing a hollow, cone-shaped spray of finely-sized droplets. Other atomization techniques may be employed such as pressurized atomization centrifugal force (spinning disc), sonic or ultrasonic techniques.

As shown in FIG. 1, an annular manifold 17 is present within nozzle 10 to supply steam to one or more injection apertures 20 which are arranged so that steam is injected in a substantially circular pattern around the atomized starch slurry being sprayed from orifice insert 16. The injection aperture may consist of a plurality of annularly-positioned, spaced-apart orifices which are symmetrically placed about the longitudinal axis of the nozzle. Alternatively the aperture 20 may be a continuous annular orifice.

A nozzle cap 30 constitutes the lower portion of nozzle assembly 10. Nozzle cap 30 may be secured to the nozzle body by cylindrical threads 31, so that the cap can be unscrewed from the nozzle body for purposes of cleaning or for substituting nozzles caps of different geometry. The nozzle cap is preferably frustoconical in shape and terminates at nozzle vent aperture 33.

The enclosed space between the inner surface of the nozzle cap 30, orifice 16 and aperture 20 form an enclosed chamber 32 in which the cornstarch is gelatinized. The size and shape of the chamber and the size of vent aperture 33 are designed to permit the atomized droplets of cornstarch slurry to reach a sufficiently high temperature for a time effective to achieve essentially complete cooking or gelatinization of the cornstarch. It has been found that a longer spray cap chamber is required for the gelatinization of the hydroxypropylated dent cornstarch of this invention as compared to the modified tapioca starch which was processed in Examples 1 and 21 of the Pitchon et al. patent. For the nozzle of this invention the distance between the atomization aperture and the vent aperture must be within the range of from 1.6 to 3.2 inches (4.06 to 8.12 cm). It has additionally been found that the design of the nozzle must be modified in order to achieve smooth operation of the nozzle over times in excess of several minutes. It has also been found that spitting and globbing occurs when tapioca starch is used with the nozzle of FIG. 1.

In order for the atomized cornstarch to consistently reach the required temperature for the necessary period of time and to produce a continuous stream of uniformly-sized droplets of gelatinized cornstarch from aperture 33, it was found necessary to both extend the slurry orifice 16 below the steam injection aperture 20 by a distance of from about ¼ to ⅜ inches (6.4 to 9.5 mm), typically about 5/16 inches (7.9 mm), and to partially disrupt the flow of steam which exits aperture 20. This disruption is preferably achieved by forming a concave groove 22 around the bottom portion of nozzle core 11 and extending the diameter of the nozzle core below groove 22 to produce lip 24. It is thought that this groove and lip arrangement causes a low pressure area around the slurry orifice which facilitates the atomization of the starch slurry. This allows the starch slurry to stay atomized throughout the longer cooking chamber without globbing.

FIG. 1 also depicts the spray drying tower 40 into which the spray of gelatinized cornstarch passes upon exiting from nozzle cap aperture 33. Only one nozzle assembly 10 is shown in FIG. 1; however, it will be apparent that a plurality of nozzles may be combined in one spray drying tower. It may, in fact, be desirable to position two or more nozzle assemblies such that their spray patterns intersect and an agglomeration or coalescing of the spray droplets is achieved. In this manner the particle size of the spray-dried material can be adjusted without the need of a separate agglomeration step.

Utilizing the nozzle structure described above, such variable as temperature and vapor pressure within the air cap, the temperature, pressure and flow rate of the steam, the concentration and flow rate of the cornstarch slurry, the size of the air cap and the vent aperture and the inlet and outlet temperature and flow rate of drying air may be adjusted by those skilled in the art in light of the techniques herein and in the Pitchon et al, patent.

This invention is further described but no limited by the following Example.

EXAMPLE

An aqueous; 41% solids dent cornstarch slurry is fed to a reactor tank. An aqueous solution is also added to the reactor tank, the solution containing sodium sulfate at a level of 20% by weight of dry starch solids, sodium hydroxide at a level sufficient to raise the pH of the slurry to 11.2 and water in an amount to produce a starch solids level of 36% by weight. Propylene oxide is then added to the reactor tank at a level of 9.0% by weight based on dry starch solids. The reactor was then sealed and the reaction allowed to proceed with agitation. The reaction started at 100° F. (37.8° C. ) and after about 4 hours the temperature was raised to about 125°0 F. (51.6° C.). The reaction is permitted to run for a period of about 10 to 14 hours in order to obtain a hydroxypropylated cornstarch which has a gel temperature, as determined by a Brabender Viscometer, at 55° C. At the desired end point of the reaction the slurry in the reactor is vented and the slurry is aerated with nitrogen gas to remove residual propylene oxide.

The slurry is led from the reactor, combined with a stream of dilution water which reduces the solids level to about 18% and fed to a washing centrifuge which is controlled to produce a washed slurry (underflow) having a starch solids content of 38±1% and a conductivity of less than 4,000 umho/cm (as measured with a Fisher conductivity meter Model 152, a product of Fisher Instrument Co., Pittsburgh, PA). The amount of water which is added during washing, both as dilution water and wash water, was about 1 gallon per pound of starch solids (dry basis).

The 38% solids slurry is then neutralized to a pH of 7.5 to 8.5 via the addition of phophoric acid. The neutralized slurry is spray-dried using the nozzle depicted in FIG. 1. this nozzle had the slurry orifice extending 5/16 inches (7.9 mm) below the steam orifice, had a #48T orifice and a 28T spinner, both products of Spraying Systems, Co., Wheaton, IL, and had an air cap with a cone length of 1.75 inches (4.4 cm) and a 0.25 inch (6.4 mm) vent diameter. The slurry was fed to the nozzle at a pressure of 2500 psig. and steam was supplied to the nozzle at a pressure of 150 psig. Slurry droplets passed from the nozzle air cap into a spray drying tower and into a cocurrent flow of heated air having an air inlet temperature of 390° F. and an air outlet temperature of 210° . The resulting continuously-produced, spray dried, pregelatinized dent cornstarch was sufficiently free from off-flavor to be suitable for use in vanilla-flavored instant pudding mixes, and was found to be equivalent to pregelatinized tapioca starch when evaluated for viscosity building capacity.

We claim:

1. A method for continuously producing particles of pregelatinized, modified dent cornstarch which are essentially flavor-free and which have a viscosity building capacity equivalent to spray-dried and pregelatinized tapioca starch comprising the steps of:

(a) forming a homogenous aqueous slurry of raw dent cornstarch, said slurry having a starch solids content of from about 0.5 to 0.7 parts raw cornstarch for each part water, one or more salts selected from the group consisting of sodium sulfate, sodium chloride and magnesium sulfate in an amount of 0.01 to 0.4 parts per part of cornstarch and sufficient base material to elevate the pH of the slurry from 10.5 to 12.3;

(b) adding propylene oxide to the slurry of step (a) in an amount of from 0.06 to 0.2 parts per part of cornstarch;

(c) sealing the mixture of step (b) in an agitated reaction vessel for a period of from 8 to 24 hours at a temperature of from 38° to 60° C., the reaction period being effective to produce cornstarch solids which have a gel temperature of from 53° to 59° C.;

(d) washing the reacted starch solids in a manner which will yield a slurry having a starch solids level of above 35% by weight;

(e) neutralizing the reacted slurry to a pH of from 6.0 to 9.0;

(f) gelatinizing the washed and neutralized starch solids by spraying the slurry through a centrally-located orifice in a two-fluid nozzle and into a cooking chamber to form a cone-shaped spray of finely-atomized droplets, injecting steam downwardly into the cooking chamber in a circular pattern which surrounds the cone-shaped spray via an annular orifice or a plurality of annularly-positioned, spaced-apart orifices which surround the slurry orifice and partially disrupting the flow of steam to cause a low pressure area around the slurry orifice which facilitates atomization of the starch slurry, wherein the slurry orifice extends below the steam orifice, wherein the slurry orifice is contained in a center core member which is shaped to effect the partial disruption of the flow of steam exiting the steam orifices, wherein the cooking chamber surrounds the slurry and steam orifices and contains a vent aperture, and wherein the cooking chamber and its vent aperture are sized to effect a temperature, moisture content and retention time sufficient to uniformly gelatinize the atomized cornstarch;

(g) passing gelatinized cornstarch particles through the chamber aperture and drying said particles in a tower via contact with heated air.

2. The method of claim 1 wherein the washed starch solids level of the slurry of step (d) is 35 to 45% by weight.

3. The method of claim 2 wherein the amount of water added for the washing of step (d) is from 0.6 to 1.8 gallons per pound of starch solids.

4. The method of claim 1 wherein the distance between the atomization aperature and the vent aperture of the nozzle is from 1.6 to 3.2 inches.

5. The method of claim 4 wherein the slurry orifice of the nozzle extends from $\frac{1}{4}$ to $\frac{3}{8}$ inches below the steam aperture.

* * * * *